United States Patent
Lundell

(10) Patent No.: US 7,649,332 B2
(45) Date of Patent: Jan. 19, 2010

(54) MOTOR CONTROLLER HAVING COUNTER TO COUNT POSITION ERROR EVENTS AND METHOD OF MOTOR CONTROL USING SAME

(75) Inventor: Thomas D. Lundell, Lakeville, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 294 days.

(21) Appl. No.: 11/858,180

(22) Filed: Sep. 20, 2007

(65) Prior Publication Data

US 2009/0079380 A1    Mar. 26, 2009

(51) Int. Cl.
*G05B 19/29* (2006.01)

(52) U.S. Cl. .................. 318/603; 318/701; 318/469

(58) Field of Classification Search .................. 318/603, 318/701, 469, 602; 341/50; 324/207.21
See application file for complete search history.

(56) References Cited

U.S. PATENT DOCUMENTS

2005/0127864 A1 *   6/2005   Jin-woo et al. .............. 318/701

* cited by examiner

*Primary Examiner*—Karen Masih
(74) *Attorney, Agent, or Firm*—Boyle Fredrickson LLP; R. Scott Speroff

(57) ABSTRACT

A motor control system uses an incremental encoder that provides a signal indicative of motor position. If an illegal state change is detected in the same sampling interval, an error event is recorded and an error counter is incremented. When the number of counts exceeds a pre-determined threshold, the motor is disabled so that appropriate corrective action can be taken.

16 Claims, 2 Drawing Sheets

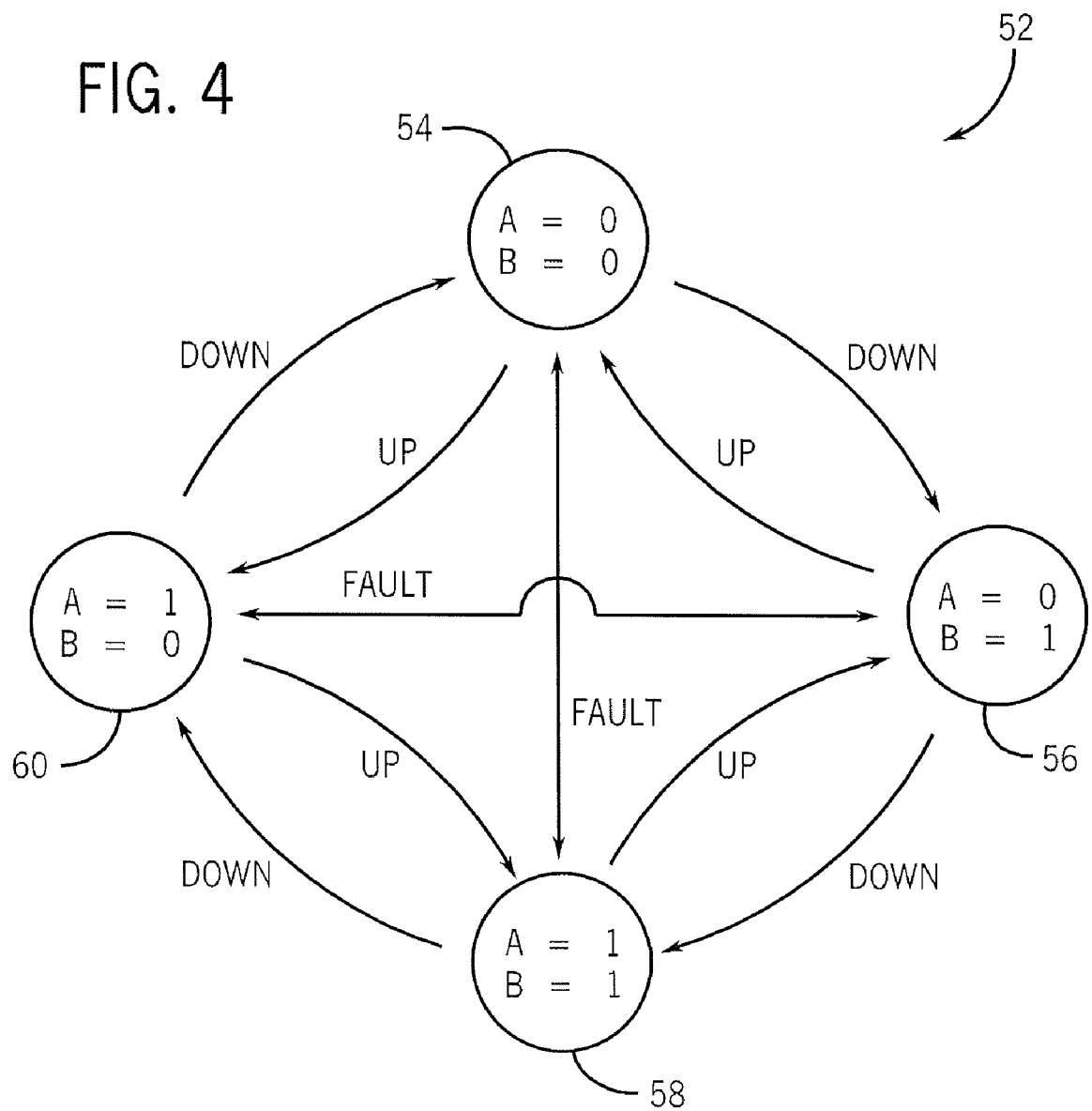

MOTOR CONTROLLER HAVING COUNTER TO COUNT POSITION ERROR EVENTS AND METHOD OF MOTOR CONTROL USING SAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to electronic controls for motors and, in particular, to a motor controller that tolerates a pre-defined number of position error events before corrective or remedial action is taken.

Electronic motor controls regulate the electrical power to a motor to control the motor's position and velocity or other dynamic characteristics including torque or force, acceleration, and power efficiency. Typically, a command signal from a user, for example, a desired motor position, is received by control logic in the motor controller which compares this command signal to a corresponding feedback signal (actual motor position) to develop an error signal. The error signal may be further processed and then used to synthesize a high-power drive signal via solid-state semiconductor devices such as MOSFET transistors. These drive signals are applied to the motor windings to move the motor to reduce the error signal, in this example, to bring the motor to the position of the command signal.

The feedback signal may be produced by a position encoder attached directly to the motor or indirectly to the motor through intervening machinery. As is understood in the art, the position encoder may be an absolute encoder, for example, generating a unique code (e.g., a Gray code) defining an absolute position of the motor. Alternatively the position encoder may be an incremental encoder (e.g., providing a pair of quadrature phased sine or square waves) defining a direction and magnitude of change of motor position but not absolute motor position. The signal from an incremental encoder may be converted to a "synthesized" absolute position signal by summing or integrating the increments of motion to a known starting or reference position.

Motor controllers may be used to control DC brushless motors. Such motors typically have a permanent magnet rotor and use a set of commutation switches connected with the rotor to detect the rotor position to switch the stator winding fields in the same manner as would be done by brushes on a standard brush type DC motor. Unlike brushes, however, the commutation switches in brushless DC motors employ non-contacting rotor position sensors, such as Hall-effect sensors, to eliminate the wear, sparking, and friction accompanying the use of brushes. For practical reasons, the circuitry of the motor controller is normally also used to provide a switching of power to the stator windings based on the signal from the commutation switches.

When the motor controller employs an incremental encoder, the incremental signal may drive a "commutation counter", initialized by the commutation switches, then used in lieu of the commutation switches for precise commutation control. The incremental signal may also be used to create a synthesized absolute position signal for feedback control by initializing an accumulating counter (for example, using the commutation switches) and then updating the accumulating counter with the incremental signal.

Motor controller systems employing incremental encoders providing synthesized absolute position offer some advantages over motor controller systems employing absolute encoders. As a general matter, incremental encoders provide equivalent accuracy at lower cost and, as mentioned, can transfer data at higher rates. However, incremental encoders are subject to errors caused by electrical noise that may mask or simulate an incremental "count". Because of the accumulation or summation process used to convert the incremental encoder signal to a synthesized absolute signal, such errors can accumulate over time to fundamentally affect the accuracy of the control system.

It is known in the art to use noise suppression or detection circuitry to monitor the signal from an incremental encoder in an attempt to neutralize or detect noise induced errors. Such techniques are not always effective particularly for high-speed encoders where noise characteristics are very similar to the characteristics of the incremental encoder signal itself. If an electrical noise event occurs at the same time as a normal transition, the encoder signals can change state in an abnormal manner. Most motor controllers detect this abnormal state change. Since an abnormal state change results in uncertainty in the estimated motor position, it is common to terminate operation of the motor if any fault is detected on the assumption that the fault is attributable to actual motor operation not electrical noise notwithstanding that this approach may lead to unnecessary motor stoppage and process downtime. This is preferred over the alternate approach of ignoring the fault altogether.

BRIEF SUMMARY OF THE INVENTION

The inventor has recognized that, in most applications, more than one fault may be tolerated and that this toleration may be preferable to stopping the process altogether. However, the present inventors recognize that for some processes, this toleration may be limited and, as such, the faults cannot be ignored entirely. Thus, the present inventors have devised a motor control that allows a user to control the number of faults or state change errors that will be tolerated before the system terminates its operation. Moreover, the number of faults can be set on a per-process basis so that the particulars of a process are considered. When the number of state change errors has reached a predefined, but programmable or settable, threshold, motor operation is disabled. Motor operation is thus terminated after a series of error events rather than a single error event, but with the number of events permitted falling within a tolerance range. The present invention recognizes that some processes may be willing to tolerate more faults than others.

In one embodiment, the motor control system uses an incremental encoder that provides a quadrature signal, embodied in a 2-bit code, that provides rotation and position information. If both bits of the 2-bit code change simultaneously, an error event is recorded and an error counter is incremented. When the number of counts exceeds a predetermined threshold, the motor is disabled so that appropriate corrective action can be taken.

In a further embodiment, the value of the pre-determined threshold is programmable.

In another embodiment, an intermediate threshold is also set to which the count of the counter is compared to provide a warning indication that the number of fault events is approaching the level at which the motor will be disabled.

Therefore, in accordance with one aspect of the invention, a motor controller system for the control of an electric motor is provided. The motor controller system includes an input for receiving an incremental encoder signal from an incremental encoder driven by the electric motor. The system further includes a counter and an error detection circuit that determines errors in the incremental encoder signal and increments the counter with each error. The system also includes an output for disabling the electric motor if an error count of the counter exceeds a pre-defined threshold that is greater than one.

In accordance with another aspect, the present invention is directed to an improvement for a servomotor drive for use with a servomotor receiving driving electrical signals from the servomotor drive in response to position feedback signals from an encoder communicating with the servomotor. The improvement includes a state change monitor that monitors the position feedback signal to detect illegal state changes in the position feedback signal. A counter is provided to accumulate the number of illegal state changes detected by the state change monitor. The improvement further includes a fault management circuit that indicates a fault after a predetermined number of illegal state changes, wherein the predetermined number is greater than one.

According to another aspect, the present invention includes a motor controller system for an electric motor. The motor controller system includes a fault detection circuit that detects illegal state changes in an incremental encoder signal acquired from an incremental encoder operatively connected to the electric motor. A first register is programmable to contain a first value indicative of a user-defined limit on a number of illegal state changes that will be accepted before remedial action is taken. The motor controller system further includes a comparator that compares the number of illegal state changes to the first value and if the number of illegal state changes equals or exceeds the first value, a signal that disables the electric motor is output.

These particular features and advantages may apply to only some embodiments falling within the claims and thus do not define the scope of the invention.

BRIEF DESCRIPTION OF THE DRAWINGS

FIG. 4 is a state diagram that governs operation of the state decoder shown in FIG. 2.

DETAILED DESCRIPTION OF THE INVENTION

Figure 1:
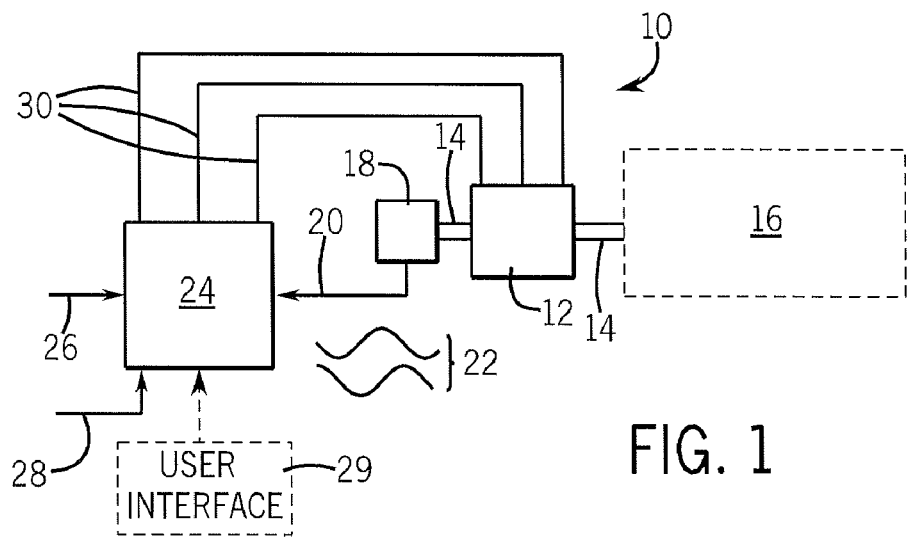
FIG. 1 is a block diagram of a position encoder system employing a brushless DC motor with commutation switches connected with an incremental encoder and communicating with the controller of the present invention.

Referring now to FIG. 1, a motor controller system 10 suitable for use with the present invention provides a permanent magnet DC motor 12 having a moving portion 14 connected with controlled machinery 16 where position, velocity, and/or other dynamic conditions may be controlled.

The moving portion 14 of the motor 12 may connect with an encoder 18 providing an incremental position signal 20, for example, quadrature-phased sine waves 22, to the motor controller 24. The quadrature-phased sine waves 22 provide an indication of shaft direction based on whether one quadrature waveform is 90° advanced or 90° retarded behind the other quadrature waveform, and provide an indication of incremental shaft movement by a counting of sine wave cycles or interpolated fractions of a sine wave cycle. The quadrature-phased sine waves could also be quadrature-phase square waves. The encoder 18 may be connected directly to the moving portion 14 of the motor 12 or connected to the moving portion 14 through other elements of the controlled machinery 16 possibly through the agency of additional shafts, gears, belts or the like providing relative speed increases or reductions.

Figure 2:
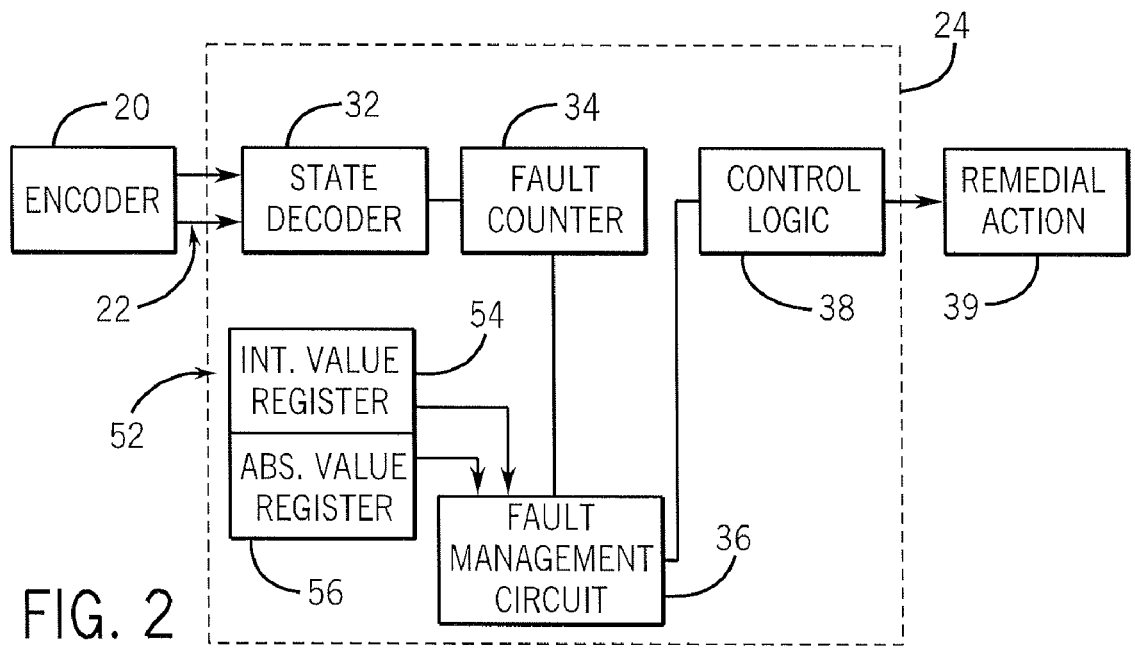
FIG. 2 is a block diagram of a portion of the motor controller shown in FIG. 1.

The motor controller 24 may also receive a command signal 26, for example, providing a commanded position or velocity signal, and a variety of user controlled parameters 28, for example programming maximum speeds, maximum acceleration rates, alarm thresholds, and the like, as are understood in the art, using a suitable programming interface 29, such as a workstation computer. As will be further described below, the programming interface 29 may also be used to define one or more error limits by programming one or more registers (as shown in FIG. 2) stored in memory of the motor controller 24.

Generally, the motor controller 24 processes the command signal 26 and the incremental position signal 20 to generate drive signals 30 providing electrical power to stator windings of the motor 12 to provide the desired motion of motor 12. The motor controller 24 may be implemented as hardware, software, or a combination of both.

As described above, the incremental encoder provides quadrature-phased sine or square waves that can be processed to determine shaft direction and incremental shaft movement. The quadrature waveforms effectively provide a 2-bit code that allows the motor controller to sense position changes, including the direction of the change. As shown in FIG. 2, the motor controller 24 includes a state decoder 32 that decodes the quadrature waveforms. A fault or error is detected if both bits of the 2-bit code change states simultaneously. When a fault is detected, a fault counter 34 is incremented. In one embodiment, the fault counter is an 8-bit counter. As the fault counter 34 is incremented, a fault management circuit 36 samples the contents of the counter and compares the value of the counter to one or more threshold values. When the number of detected errors or exceeds equals a threshold value, the fault management circuit 36 transmits a signal to the control logic 38 of the motor controller 24 indicating that the number of signal errors has exceeded a user-defined limit and that appropriate corrective or remedial measures 39 should be taken, such as shutting down the motor or other machinery.

Figure 3:
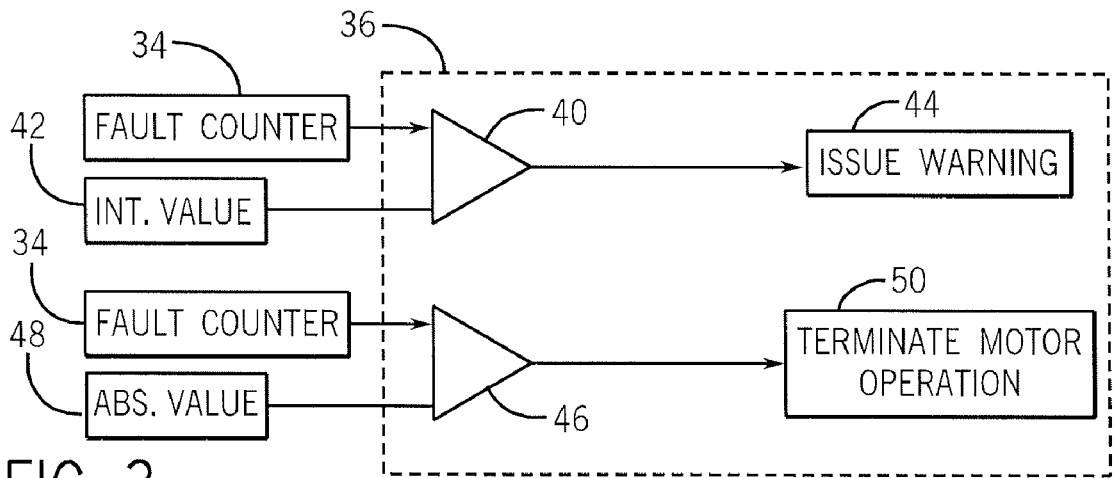
FIG. 3 is a block diagram of a portion of the fault management circuit shown in FIG. 2.

Referring now to FIG. 3, in one embodiment, the fault management circuit 36 includes a pair of comparators 40, 46 that compare the value of the fault counter 34 to a respective threshold. More particularly, comparator 40 compares the value of the fault counter 34 to a user-programmable intermediate or warning threshold value 42. When the value of the fault counter 34 equals the warning threshold value 42, the fault management circuit 36 issues a suitable warning 44, such as through a human machine interface or front panel indicator. Comparator 40 allows an operator to be signaled that signal errors are being detected before a disable level, i.e., absolute threshold 48, is reached. Thus, an operator is signaled to investigate and take possible corrective action before remedial action, such as shutting down the motor, is necessary.

Comparator 46 is associated with an absolute threshold 48 such that the fault management circuit 36 issues a suitable signal 50 to the control logic 38 to stop movement of the electric motor when the value of the fault counter 34 reaches or exceeds the absolute threshold 48. The absolute threshold 48 is also user-programmable by an attachable program terminal, such as workstation 29.

As described above, the motor controller 24 includes a state decoder 32 that decodes a quadrature signal 22 to determine error events from the output of the incremental encoder 18. In this regard, the state decoder 32 operates according to the state diagram 52 illustrated in FIG. 5. The state diagram 52 is set up to define four separate states 54, 56, 58, and 60 cyclically arranged with respect to one another so as to define four legal state transitions. On the other hand, the state diagram 52 defines two error or illegal state transitions. For instance, a transition from state 54 to state 56 would be considered a legal state change whereas a transition from state 56 to state 60 would be considered an illegal state change. In this regard, an error or illegal state change occurs when both bits (A and B) change states between successive sampling intervals. This will be reflected by both the "A" and the "B" bits changing states between successive sampling intervals, i.e., transition from state 56 to state 60 or from state 54 to state 58, for example.

As such, if both bits are at logic LOW or "0" at sample 1 and then both bits are at logic HIGH or "1" at sample 2, indicative of a transition from state 54 to state 58, an error signal will be generated and the fault counter will be incremented by one. On the other hand, if one of the bits (A or B) is at logic HIGH at sample 2, but the other bit remains at logic LOW, e.g., state 56 or state 60, a fault will not be detected. Moreover, as reflected in the state diagram 58, if a fault transition is detected at sample 2 (transition from state 54 to state 58, for example) but only one bit changes states at sample 3 (transition from state 58 to either state 56 or state 60), a fault will not detected at sample 3. Thus, it is possible for a non-fault event to occur after a fault event has been detected.

The present invention has been described in terms of the preferred embodiment, and it is recognized that equivalents, alternatives, and modifications, aside from those expressly stated, are possible and within the scope of the appending claims. For example, although the invention has been described in the context of rotary machinery, it is equally applicable to linear devices.

I claim:

1. A motor controller system for the control of an electric motor comprising:
    an input for receiving an incremental encoder signal from an incremental encoder driven by the electric motor;
    a counter;
    an error detection circuit that determines errors in the incremental encoder signal and increments the counter with each error; and
    an output for disabling the electric motor if an error count of the counter exceeds a pre-defined threshold, wherein the pre-defined threshold is greater than one.

2. The motor controller system of claim 1 wherein the incremental encoder has a moving portion, and wherein the incremental encoder signal is a quadrature signal comprised of a first signal and a second signal that may be decoded to determine movement and direction of the moving portion.

3. The motor controller of claim 2 wherein the error detection circuit determines errors in the incremental encoder signal by comparing the state of the first and second signals at a first time interval to the state of the first and second signals at a second time interval.

4. The motor controller of claim 3 wherein the error detection circuit increments the counter if a simultaneous change in the state of both the first and second signals occurs between the first time interval and the second time interval.

5. The motor controller of claim 1 wherein the pre-defined threshold is user-programmable.

6. The motor controller of claim 1 further comprising a fault detection circuit that monitors the count of the counter and signals the output to disable the electric motor if the error count exceeds the pre-defined threshold.

7. The motor controller of claim 6 wherein the fault detection circuit signals the output to issue a warning signal if the count of the counter exceeds an intermediate threshold less than the pre-defined threshold.

8. In a servomotor drive for use with a servomotor receiving driving electrical signals from the servomotor drive in response to position feedback signals from an encoder communicating with the servomotor, an improvement comprising:
    a state change monitor monitoring the position feedback signal to detect illegal state changes in the position feedback signal;
    a counter accumulating a number of illegal state changes detected by the state change monitor; and
    a fault management circuit indicating a fault after a predetermined number of illegal state changes, wherein the predetermined number is greater than one.

9. The improvement of claim 8 wherein the fault management circuit includes a first comparator comparing an output of the counter to a first error limit and a second comparator comparing the output of the counter to a second error limit greater than the first error limit.

10. The improvement of claim 9 wherein in the fault management circuit provides a warning limit for illegal state changes greater than the first error limit and less than the second error limit and an absolute limit for illegal state changes if a change equals the second error limit.

11. The improvement of claim 8 wherein the fault management circuit outputs a value of the counter.

12. The improvement of claim 8 wherein the position feedback signal is a quadrature incremental encoder signal and the illegal state changes involve a state change indicating a transition of both channels of the incremental encoder signal.

13. The improvement of claim 8 wherein the predetermined number is user programmable.

14. A motor controller system for the control of an electric motor comprising:
    a fault detection circuit that detects illegal state changes in an incremental encoder signal acquired from an incremental encoder operatively connected to the electric motor;
    a first register that is programmable to contain a first value indicative of a user-defined limit on a number of illegal state changes that will be accepted before remedial action is taken; and
    a comparator that compares the number of illegal state changes to the first value and if the number of illegal state changes equals or exceeds the first value outputs a signal that disables the electric motor.

15. The motor controller system of claim 14 wherein the first value is programmable to be greater than one.

16. The motor controller system of claim 14 further comprising a second register that is programmable to contain a second value indicative of a user-defined limit on the number of illegal state changes that may occur before a warning signal is provided signaling that the number of illegal state changes is approaching the first value.

* * * * *